United States Patent [19]

Salkeld

[11] Patent Number: 4,918,909
[45] Date of Patent: Apr. 24, 1990

[54] GREEN ASPARAGUS HARVESTER

[75] Inventor: William J. Salkeld, Cowra, Australia

[73] Assignee: Linero Pty. Ltd., Cowra, Australia

[21] Appl. No.: 238,572

[22] Filed: Aug. 30, 1988

[30] Foreign Application Priority Data

Aug. 31, 1987 [AU] Australia ................ PI4077

[51] Int. Cl.$^5$ .............................. A01D 45/00
[52] U.S. Cl. ..................... 56/327.2; 56/10.2
[58] Field of Search ............ 56/327.2, 327.1, 10.2, 56/14.3, 14.5, DIG. 15

[56] References Cited

U.S. PATENT DOCUMENTS

| | | | |
|---|---|---|---|
| 3,636,687 | 1/1972 | McKissick et al. | 56/DIG. 15 |
| 3,717,986 | 2/1973 | Lawson | 56/327.2 |
| 4,288,970 | 9/1981 | Wilde | 56/327.2 |
| 4,507,910 | 4/1985 | Thornley et al. | 56/DIG. 15 |
| 4,512,145 | 4/1985 | Lund | 56/327.2 |
| 4,629,005 | 12/1986 | Hood, Jr. et al. | 56/327.1 |

*Primary Examiner*—Jerome W. Massie, IV
*Assistant Examiner*—Terry Lee Melius
*Attorney, Agent, or Firm*—Harness, Dickey & Pierce

[57] ABSTRACT

An asparagus spear selection and picking unit for a harvester of green asparagus has at least one pair of tynes which are mounted adjacent to, but spaced apart from, each other. The adjacent edges of the tynes are shaped to provide a tapered channel leading to the nip of a pair of soft conveyors mounted adjacent to each other and extending upwards at an acute angle relative to the horizontal. The height of the pair of tynes above ground level is adjustable. When a growing asparagus spear has a height sufficient for its tip to be guided into the nip of the soft conveyors by the tynes, its top is gripped by the soft conveyors. Shortly after being gripped by the soft conveyors, the tip of the spear activates a sensor (a microswitch or an electro-optical device) to generate a signal which activates a cutter to cut the spear at or near its base. The cut asparagus spear is then conveyed by a series of conveyors to be deposited in a required orientation in a skip, field basket or pocket being carried on the harvester.

14 Claims, 6 Drawing Sheets

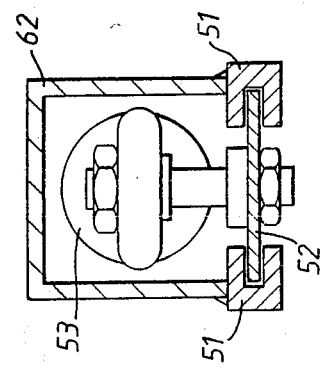
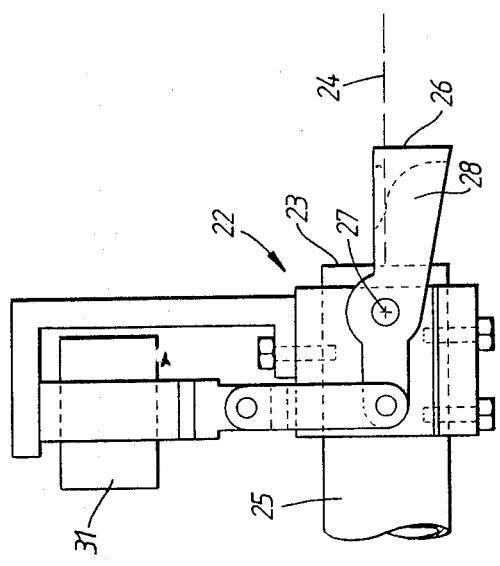
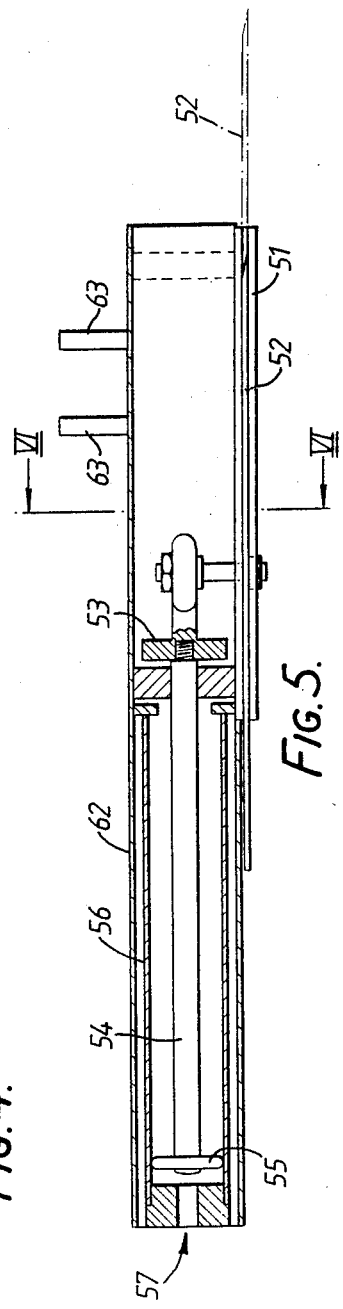

GREEN ASPARAGUS HARVESTER

TECHNICAL FIELD

This invention concerns the harvesting of green asparagus. More particularly, it concerns an asparagus spear selection and picking unit for use in a mechanical harvester of green asparagus.

BACKGROUND

When green asparagus is planted, the asparagus spears do not grow at a constant rate. Thus a row of asparagus will contain spears of various lengths, only the tallest of which will be suitable for picking.

Asparagus harvesters have been designed for picking asparagus spears, but those harvesters (a) are slow and (b) pick spears of all heights. Consequently, such harvesters are wasteful. Indeed, they are seldom used, for it is more economical to use manual labour to pick asparagus spears every two days over the four months period when asparagus plants produce spears of acceptable length. Manual picking of asparagus spears, however, is uncomfortable and thus unattractive work, and labour for this task is often difficult to find at the harvest period.

DISCLOSURE OF THE PRESENT INVENTION

It is an object of the present invention to provide a mechanical harvester for green asparagus which selectively picks only those asparagus spears which have a length which exceeds a predetermined value.

This objective is achieved by a harvester which incorporates a spear selection and picking unit which includes a coarse comb arrangement, the tynes of which are arranged in pairs and are tapered so that each pair of tynes acts to direct an asparagus spear into the nip of a pair of soft conveyors mounted adjacent to each other and extending, at an acute angle upwards relative to the horizontal, from the region of the tynes to a main conveyor. The height of the tynes above ground level, and hence of the nip of the soft conveyor pairs above ground level, is variable. When an asparagus spear has a height such that is is directed by the tynes into the nip of a soft conveyor pair, the soft conveyors grip the top of the spear and lift it as the harvester moves forward. Shortly after entering the nip of the pair of soft conveyors, the top of the spear strikes a microswitch, or interrupts an optical beam that is incident upon a photocell, or activates another form of electromechanical or electro-optical device, to generate a signal which activates a spear cutting device that causes the asparagus spear to be cut at its base.

The cut asparagus spear is then conveyed upwardly by the soft conveyor pair to be placed on the main conveyor. The main conveyor aligns and transports the asparagus spear, tip first, to a cleated conveyor. The aligned spear is then placed into one of the compartments defined by the cleats of the cleated conveyor. The cleated conveyor transports the spear to a discharge point, where the spear is deposited into a field skip or basket, or into a pocket for hand packing.

Thus, according to the present invention, there is provided an asparagus harvester having a spear selection and picking unit, the asparagus harvester comprising:

(a) a comb comprising at least one pair of tynes, the tynes of the or each pair of tynes being spaced from each other and defining a tapered feed channel for asparagus spears which have a height sufficient to be engaged by one of the adjacent edges of the pair of tynes;

(b) a pair of elongate soft conveyors associated with the or each pair of tynes, said or each pair of soft conveyors (i) being mounted adjacent to each other with one end thereof adjacent to the narrow end of the feed channel formed by its associated pair of tynes, and (ii) being spaced apart a distance sufficient to enable the pair of soft conveyors to grip the top of a spear of asparagus without causing damage thereto; the elongate direction of each soft conveyor forming an acute angle relative to the horizontal;

(c) a spear sensing device mounted adjacent to said or each pair of soft conveyors, near to the end thereof which is adjacent to the narrow end of the feed channel formed by its associated pair of tynes, said spear sensing device being activated by the top of a passing spear of asparagus gripped by its associated pair of soft conveyors; and (d) asparagus spear cutting means, adapted to cut a spear of asparagus at or near its base, said cutting means being positioned substantially below said electromechanical or electro-optical device and being activated when said electromechanical or electro-optical device is activated;

(e) at least one main conveyor having a tail pulley and a shroud partially surrounding said tail pulley, said at least one main conveyor being mounted with its tail pulley adjacent to, but lower than, the upper end of said or each pair of soft conveyors, whereby the bottom end of the cut spear of asparagus being transported by the or a pair of soft conveyors bears against said shroud and is partially rotated in its associated pair of soft conveyors before being released therefrom, so that the cut spear of asparagus falls on to the main conveyor for transportation tip first by the main conveyor;

(f) a cleated conveyor mounted at the end of said at least one main conveyor, said cleated conveyor being adapted to transport cut asparagus spears deposited thereon from said at least one main conveyor in a direction substantially at right angles to the direction of conveying of said at least one main conveyor; and (g) at least one roller between the discharge end of said at least one main conveyor and said cleated conveyor.

The cutting means is preferably a reciprocating pneumatic blade or a cutting arrangement which utilises a high pressure water jet. As indicated above, the spear sensing device is preferably a microswitch or a device incorporating a light beam which is incident upon a phot-cell.

The present invention also encompasses a green asparagus harvester which incorporates the spear selection and picking unit of the present invention.

An embodiment of the present invention will now be described, with reference to the accompanying drawings.

BRIEF DESCRIPTION OF THE DRAWINGS

FIG. 4 is a side view of the preferred water jet cutter of asparagus spears.

FIG. 5 is a partly schematic view of an assembly of the components of a pneumatic reciprocating knife for cutting asparagus spears.

FIG. 6 is a sectional view at VI—VI of the knife assembly of FIG. 5.

DETAILED DESCRIPTION OF THE ILLUSTRATED EMBODIMENT

Figure 1:
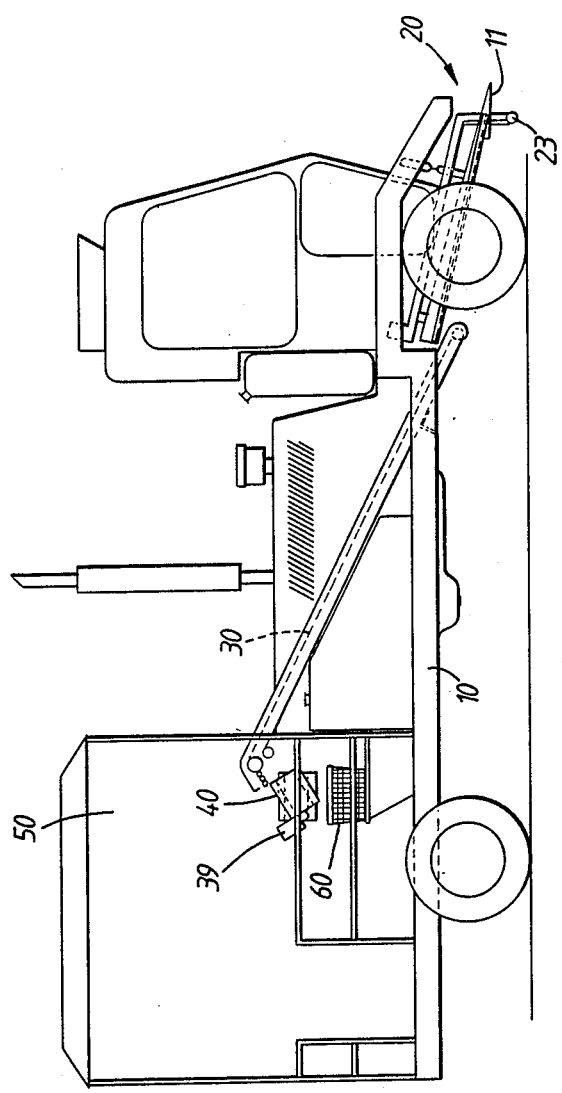
FIG. 1 is a partly schematic side view of an asparagus harvester which incorporates the selection and picking unit of the present invention.

The harvester illustrated (partly schematically) in FIG. 1 has a harvester frame 10 which supports an asparagus spear selection and picking unit 20, a main conveyor 30 and a cleated packing conveyor 40. The cleated conveyor is within a packing station 50 of the harvester, in which a number of field baskets 60 or packing skips are carried.

Figure 2:
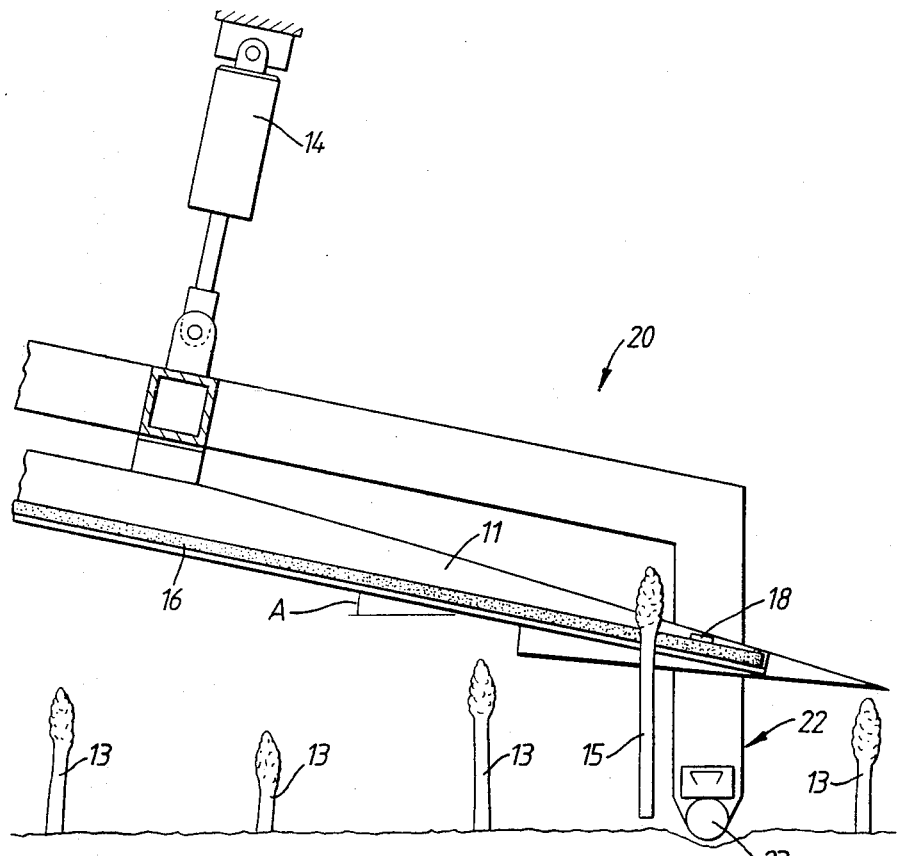
FIG. 2 is a partly schematic side view of an embodiment of the asparagus spear selection and picking unit.
Figure 3:
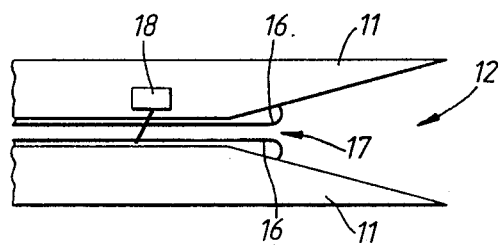
FIG. 3 is a top view of the tynes and the lower end of the soft conveyor assembly of the unit of FIG. 2.

The spear selection and picking unit 20 is illustrated in more detail in FIGS. 2 and 3. Normally this unit will have a plurality of the illustrated assemblies mounted side by side, so that a number of adjacent rows of growing asparagus can be harvested simultaneously. However, for convenience, only one row of asparagus spears and only one pair of collection tynes are illustrated in FIGS. 2 and 3.

In the arrangement shown in FIGS. 2 and 3, a pair of tapered tynes 11 define a tapered channel 12, which is positioned by the operator of the harvester or by a row tracing system to be aligned with a row of growing asparagus spears 13. The height of the channel 12 above ground level is controlled by the operator by the harvester, or by a height sensing device (for example, a sonic height measuring device). The operator or the signal from the height sensing device controls a hydraulic ram 14 that is connected between the harvester frame 10 and the selection and picking unit 20.

Figure 7:
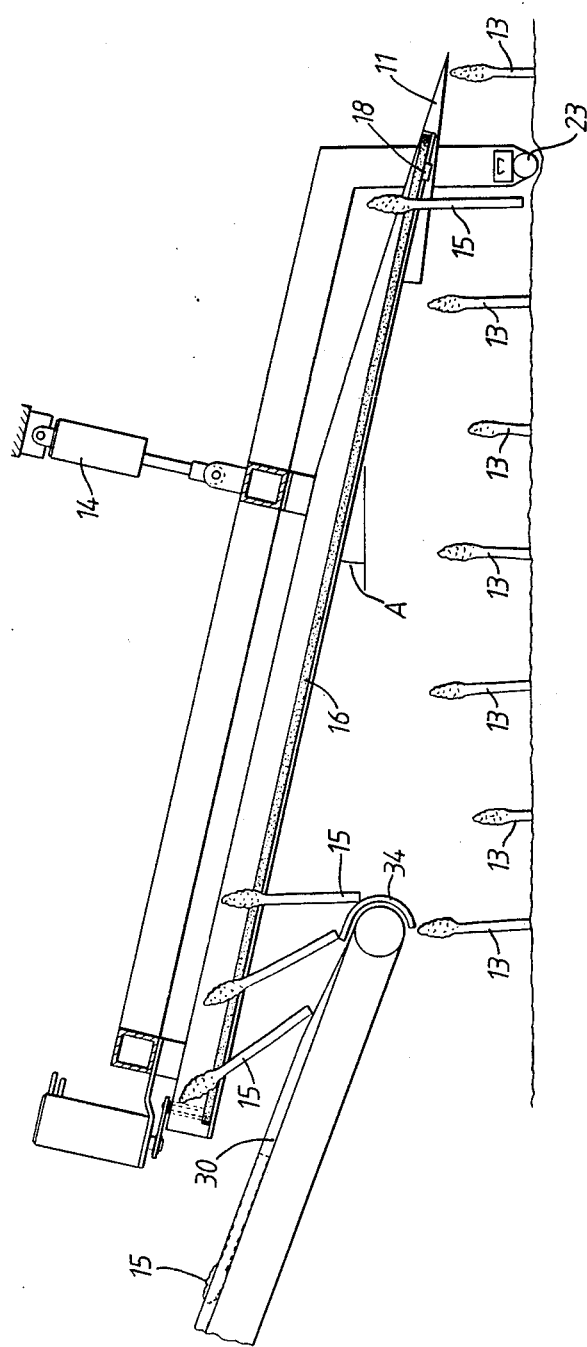
FIG. 7 illustrates how the soft conveyor deposits a cut asparagus spear on to a main conveyor of a harvester, to ensure that the spear is transported tip first by the main conveyor.

Each pair of tynes 11 has an associated pair of elongate soft conveyors 16. A soft conveyor is a conveyor to the belt of which a layer of sponge material or the like is affixed. The pair of soft conveyors 16 are mounted side by side, adjacent to the tynes 11, so that the ends of the conveyors define a nip region 17 at or near the narrow end of the tapered channel 12. The spacing between the soft conveyors 16 is preferably adjustable, and is set to be such that if the top of an asparagus spear should enter the nip region 17, it would be gently gripped by the pair of soft conveyors. As shown in FIGS. 2 and 7, the elongate direction of the soft conveyors 16 is at an acute angle A relative to the horizontal. The angle A will normally be within the range of from 5° to 15°.

As the harvester moves forward, the channel 12 formed by the tynes 11 passes over the growing spears of asparagus. Those spears which are not tall enough to enter into the channel 12 are unaffected by the harvester. An asparagus spear 15 which has a length sufficient for its top to enter into the channel 12 is guided by the facing edges of the tynes 11 into the nip 17 formed by the lower ends of the soft conveyors 16. Here the top of the asparagus spear is gripped by the soft conveyors 16.

The forward speed of the harvester is preferably arranged to be substantially equal to the horizontal component of the movement rate of the soft conveyors 16. Thus as the asparagus spear 15 progresses along the feed path defined by the opposed surfaces of the soft conveyors 16, the spear 15 is not pulled forwards or rearwards, but its top is lifted and the spear is straightened.

A microswitch 18 is mounted near to the nip 17 of the soft conveyors 16. As noted above, this microswitch may be replaced with a device incorporating a light beam and a photo-cell, or by any other suitable electro-mechanical or electro-optical device. The microswitch 18 controls the operation of a spear cutter 22 which forms part of the selection and picking unit. The cutter 22 has a cutting head 23 directly below the microswitch 18 and close to the soil in which the asparagus is being grown. When the microswitch 18 is activated by the top of a tall asparagus spear 15, the cutting head 23 is operated to cut through the spear 15 close to the point where the spear 15 leaves the soil. Further movement of the harvester now results in the cut spear 15 being lifted by the pair of soft conveyors 16 until, as shown in FIG. 7, the lower end of the cut spear 15 bears against the curved shroud 34 of the tail pulley of the main conveyor 30. Further movement of the soft conveyors 16 causes the cut spear 15 to be tilted so that, when the cut spear 15 is at the upper end of the soft conveyors and is released from them, it falls on to the main conveyor 30 (which is preferably transversely dished to ensure that a cut spear 15 cannot roll sideways off it) so that it is transported tip first by the main conveyor.

The preferred form of the cutter 22 is illustrated in FIG. 4. This cutter uses a high pressure jet of water 24 from the cutting head 23 to cut through an asparagus spear. Water is supplied to the cutting head through a pipe or conduit 25. When not required for cutting through an asparagus spear, the water jet 24 is deflected into the soil by a deflector 26 which is mounted on a pair of side arms 28 which are rotatable about an axle 27 which extends from the cutting head 23. Movement of the deflector 26 is effected by actuating a solenoid switch 31, which causes a ferromagnetic member to move and lift the ends of the side arms 28 which are remote from the deflector 26. The jet 24 is then not deflected, but strikes the lower end of the asparagus spear 15 to cut through it. Actuation of the solenoid switch is effected when the microswitch 18 is actuated by the head or tip of the asparagus spear 15.

FIGS. 5 and 6 illustrate one form of reciprocating knife assembly that may be used to cut the asparagus stalks. Such knife assemblies are known technology. Briefly, the assembly comprises a pair of blade guides 51 within the slots of which a hardened steel blade 52 can move. The blade 52 is supported on a piston 53 which is mounted on one end of a rod 54. The rod 54 has a second piston 55 mounted on its other end. The second piston 55 is a close fit within a tube 56 which is a component of a double acting, reciprocating linear actuator. The whole assembly is contained within a housing 62 which is connected to the asparagus selection and picking unit 20 using mounting brackets 63.

When air at high pressure enters the tube 56 through aperture 57, the piston 55 (and with it the rod 54 and the piston 53 which carries the blade 52) is forced along the tube 56 at high speed. This movement extends the blade 52 into the position shown in dashed outline in FIG. 5. In the course of the extension of the blade, the sharpened leading edge of the blade cuts the selected asparagus spear 15. The double acting reciprocal linear actuator then retracts the rod 54, and with it the blade 52.

Figure 8:
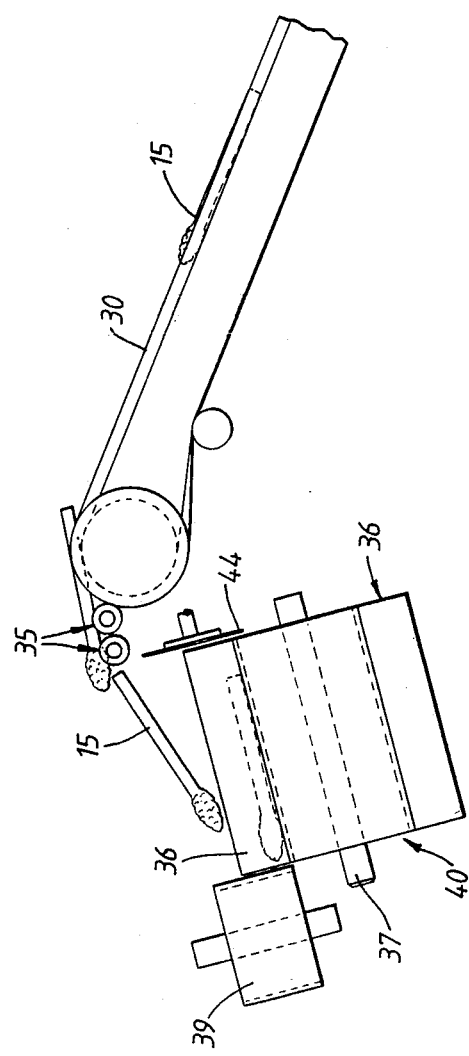
FIG. 8 is a side view of the top of the main conveyor and an end view of the cleated conveyor on to which cut asparagus spears are deposited from the main conveyor.
Figure 9:
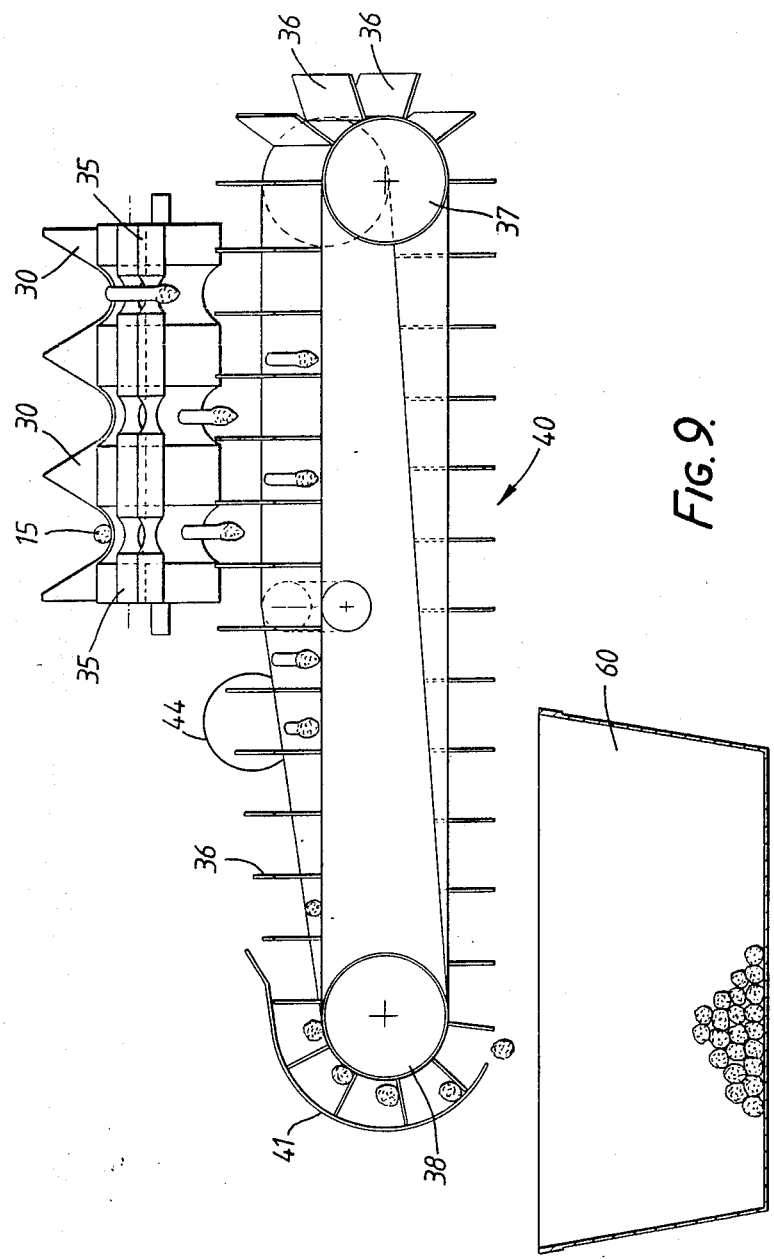
FIG. 9 illustrates the operation of the cleated conveyor and the deposition of cut asparagus spears into a field basket.

FIGS. 8 and 9 show how cut asparagus spears are transferred from the main conveyor into the cleated regions of a cleated conveyor 40.

FIG. 8 shows how asparagus spears 15 travelling on a number of side-by-side main conveyors 30 leave the conveyors 30 at their uppermost ends to fall on to accelerator rollers (also known as butting up rollers) 35 which propel them on to the cleated conveyor 40, so that they fall into the compartments created by the cleats or walls 36 of the conveyor 40. The inclined axis of the tail pulley 37 at one end of the conveyor 40 and the mounting of a buting conveyor 39 adjacent to the cleated conveyor 40 ensure that the spears are positioned on the conveyor 40 with their tips at one edge thereof.

The tail pulley 38 at the other end of the cleated conoveyor 40 is horizontal. A cleat shell 41 half-surrounds the region of the tail pulley 38, as shown in FIG. 7, and provides a convenient exit point below the tail pulley 38 for the transported spears 15. The spears fall (in the illustrated embodiment) from the exit point into a field basket 60 in the packing station 50 of the harvester.

An optical feature that is shown in FIGS. 8 and 9 is a rotating, circular knife or saw 44. This knife or saw is mounted adjacent to the side of the cleated conveyor 40 where the bases or lower stalks of the cut spears 15 are positioned, between the accelerator rollers 35 and the cleat shell 41. The knife 44 can be used to cut the asparagus spears to a predetermined length. The knife 44 may be replaced with a stationary or reciprocating knife.

Using the illustrated embodiment of the harvester, the asparagus spears are selected, cut, transported and packed into baskets efficiently, economically, and without damage to the spears.

Mechanical engineers will appreciate that although a specific embodiment of this invention has been illustrated and is described above, variations to, and modifications of, that embodiment can be made without departing from the present inventive concepts.

I claim:

1. A green asparagus harvester having (i) a spear selection and picking unit and (ii) a harvested spear collection unit, characterized in that the spear selection and picking unit comprises
   (a) a comb comprising at least one pair of tynes, the tynes of said pair being spaced from the each other and defining a tapered feed channel for asparagus spears which have a height sufficient to be engaged by adjacent edges of said pair of tynes;
   (b) a pair of elongate soft conveyors associated with said pair of tynes, said pair of soft conveyors (i) being mounted adjacent to each other with one end thereof adjacent to the narrow end of the feed channel formed by its associated pair of tynes, and (ii) being spaced apart a distance sufficient to enable the pair of soft conveyors to grip the top of a spear of asparagus without causing damage thereto; the elongate direction of each soft conveyor forming an acute angle relative to the horizontal;
   (c) an asparagus spear sensing device associated with and mounted adjacent to said pair of soft conveyors, near to the end thereof which is adjacent to the narrow end of the feed channel formed by its associated pair of tynes, said sensing device being activated by the top of a passing spear of asparagus gripped by its associated pair of soft conveyors; and
   (d) an asparagus spear cutting means, adapted to cut a spear of asparagus at or near its base, said cutting means being positioned substantially below said sensing device and being activated when said device is activated; and further characterized in that said spear collection unit comprises
   (e) at least one main conveyor having a tail pulley and a shroud partially surrounding said tail pulley, said at least one main conveyor being mounted with its tail pulley adjacent to, but lower than the upper end of said pair of soft conveyors, whereby the bottom end of a cut spear of asparagus being transported by said pair of soft conveyors bears against said shroud and is partially rotated in its associated pair of soft conveyors before being released therefrom, so that the cut spear of asparagus falls on to the main conveyor for transportation tip first by the main conveyor;
   (f) a cleated conveyor mounted at the end of said at least one main conveyor, said cleated conveyor being adapted to transport cut asparagus spears deposited thereon from said at least one main conveyor in a direction substantially at right angles to the direction of conveying of said at least one main conveyor; and
   (g) at least one accelerator roller between the discharge end of said at least one main conveyor and said cleated conveyor.

2. A harvester as defined in claim 1, in which said sensing device is an electro-optical device which includes a light beam incident upon a photo-cell.

3. A harvester as defined in claim 1, in which the asparagus spear cutting means is a reciprocating knife.

4. A harvester as defined in claim 1, in which said acute angle is an angle in the range of from 5° to 15°.

5. A harvester as defined in claim 1, in which said at least one main conveyor has a dished upper belt transverse cross-section.

6. A harvester as defined in claim 1, in which the cleated conveyor has a substantially flat belt from which its cleat walls extend, the plane of the belt of the cleated conveyor being inclined relative to the horizontal in the region where cut asparagus spears are deposited thereon, to cause the tips of the spears deposited thereon to move to the side of the cleated conveyor which is remote from the at least one main conveyor, the harvester also including a butting conveyor mounted adjacent to said side of the cleated conveyor, for limiting the movement of the tip of an asparagus spear deposited on the cleated conveyor.

7. A harvester as defined in claim 1, including an asparagus stalk cutting means mounted adjacent to the side of the cleated conveyor which is closest to said at least one main conveyor, for cutting the stalk of asparagus spears deposited on the cleated conveyor which project over the edge of the cleated conveyor.

8. A harvester as defined in claim 1, including a cleat shroud surrounding the end of the cleated conveyor to which asparagus spears deposited thereon are conveyed, said cleat shroud defining a discharge point for said asparagus spears deposited thereon, said discharge point being underneath the cleated conveyor.

9. A harvester as defined in claim 8, including a collection means positioned underneath said discharge point.

10. A harvester as defined in claim 1, in which said sensing device is an electromechanical device which includes a microswitch activated by the top of a spear of asparagus.

11. A harvester as defined in claim 1, in which said asparagus spear cutting means is a high pressure water jet.

12. A harvester as defined in claim 6, including an asparagus stalk cutting means mounted adjacent to the side of the cleated conveyor which is closest to the side of at least one main conveyor, for cutting the stalks of asparagus spears deposited on the cleated conveyor which project over the edge of the cleated conveyor.

13. A harvester as defined in claim 6, including a cleat shroud surrounding the end of the cleated conveyor to which asparagus spears deposited thereon are conveyed, said cleat shroud defining a discharge point for said asparagus spears deposited thereon, said discharge point being underneath the cleated conveyor.

14. A harvester as defined in claim 13, including a collection means positioned underneath said discharge point.

* * * * *